(12) United States Patent
Nerst et al.

(10) Patent No.: US 9,100,903 B2
(45) Date of Patent: Aug. 4, 2015

(54) SELECTING A WIRELESS COMMUNICATION TECHNOLOGY ACCORDING TO APPLICATION STATE

(75) Inventors: Alex Nerst, Ashdod (IL); Avi Shechter, Ramot-Hashavim (IL); Boaz Zilberman, Ramat-Hasharon (IL)

(73) Assignee: GENBAND US LLC, Frisco, TX (US)

( * ) Notice: Subject to any disclaimer, the term of this patent is extended or adjusted under 35 U.S.C. 154(b) by 394 days.

(21) Appl. No.: 12/679,260

(22) PCT Filed: Aug. 27, 2008

(86) PCT No.: PCT/IL2008/001161
§ 371 (c)(1),
(2), (4) Date: Mar. 19, 2010

(87) PCT Pub. No.: WO2009/040787
PCT Pub. Date: Apr. 2, 2009

(65) Prior Publication Data
US 2010/0240355 A1    Sep. 23, 2010

Related U.S. Application Data

(60) Provisional application No. 60/974,888, filed on Sep. 25, 2007.

(51) Int. Cl.
*H04M 1/00* (2006.01)
*H04W 48/18* (2009.01)
*H04W 60/00* (2009.01)
*H04W 88/06* (2009.01)

(52) U.S. Cl.
CPC .............. *H04W 48/18* (2013.01); *H04W 60/00* (2013.01); *H04W 88/06* (2013.01)

(58) Field of Classification Search
CPC ..... H04W 60/00; H04W 8/183; H04W 88/06; H04L 47/00
USPC .......... 455/552.1, 435.1, 432.1; 370/328, 252
See application file for complete search history.

(56) References Cited

U.S. PATENT DOCUMENTS

| 7,519,026 B1* | 4/2009 | Oh ................................ 370/331 |
| 2002/0087674 A1 | 7/2002 | Guilford et al. |
| 2004/0109448 A1* | 6/2004 | Hanna et al. .................. 370/389 |
| 2004/0198360 A1 | 10/2004 | Kotzin |
| 2005/0282544 A1* | 12/2005 | Oommen et al. .......... 455/432.1 |
| 2006/0215576 A1* | 9/2006 | Yu et al. ........................ 370/252 |

(Continued)

FOREIGN PATENT DOCUMENTS

| EP | 1748666 A2 | 1/2007 |
| WO | WO 2006/062354 A1 | 6/2006 |

OTHER PUBLICATIONS

European Patent Office, Communication—European Search Report mailed Jan. 2, 2013 for Application No. 08789833.4, 9 pages.

(Continued)

*Primary Examiner* — Danh Le
(74) *Attorney, Agent, or Firm* — Haynes and Boone, LLP (57) ABSTRACT

A method for an application program executed by a network terminal device to select a preferred wireless communication technology from at least two different communication technologies provided concurrently by the same network operator, according to at least one communication parameter differentiating between the two communication technologies.

21 Claims, 4 Drawing Sheets

(56) References Cited

U.S. PATENT DOCUMENTS

2008/0064393 A1* 3/2008 Oommen et al. .......... 455/432.1
2008/0153443 A1* 6/2008 Takusagawa et al. ...... 455/187.1
2009/0005041 A1* 1/2009 Steinberg et al. .......... 455/435.2

OTHER PUBLICATIONS

European Patent Office, Communication—European Office Action mailed Nov. 1, 2013 for Application No. 08789833.4, 5 pages.

* cited by examiner

SELECTING A WIRELESS COMMUNICATION TECHNOLOGY ACCORDING TO APPLICATION STATE

CROSS-REFERENCE TO RELATED APPLICATIONS

This is a national stage application filed under 35 U.S.C. 371 and claiming the benefit of the priority to U.S. Provisional Application for Patent having the Ser. No. 60/974,888 filed Sep. 25, 2007, such claim being made through PCT application PCT/IL2008/001161 (WO2009/040787) filed Aug. 27, 2008, both entitled "SELECTING A WIRELESS COMMUNICATION TECHNOLOGY ACCORDING TO APPLICATION STATE", which applications are hereby incorporated into this disclosure in their entirety.

FIELD AND BACKGROUND OF THE INVENTION

The present invention relates to selecting communication technology in a wireless communication network providing a plurality of communication technologies, and, more particularly but not exclusively, to terminal application selecting between communication technologies in a cellular network providing a plurality of communication technologies.

A mobile network terminal, typically sourcing its electric power supply from a battery, requires means to reduce the power consumption whenever possible. The most common action is to switch to idle mode as soon as possible, as described in patent application EP1509052. However, the prior art, such as EP1509052, requires switching between modes of communications, which are internal to a specific communication technology. This requires modification to both the mobile network terminal and the network (e.g. the base station, SGSN, UTRAN, etc.)

There is thus a widely recognized need for, and it would be highly advantageous to have, a method and a system for devoid of the above limitations.

SUMMARY OF THE INVENTION

According to one aspect of the present invention there is provided a method for selecting a wireless communication technology, the method comprising:

providing a communication application operative in a network terminal device operating in communication network that provides the network terminal device with at least two different communication technologies, wherein the communication application has at least two states;

associating each of the two or more states with one of the different communication technologies; and selecting the respective communication technology when the communication application enters a state associated with the selected communication technology.

Further according to another aspect of the present invention there is provided a method for selecting a wireless communication technology wherein the communication technologies differ according to at least one of: power consumption, bandwidth, bit-rate, throughput and quality of service.

Additionally according to another aspect of the present invention there is provided a method for selecting a wireless communication technology, the method including:

providing a network terminal device operative in communication network, the communication network providing the network terminal device with at least two different communication technologies, the communication technologies differing by at least one parameter;

defining at least one threshold for at least one of the communication parameters;

comparing at least one required communication parameter of the network terminal device with at least one of the thresholds to form a comparison result;

selecting one of the communication technologies according to the comparison result.

According to another aspect of the present invention there is provided a method for selecting a wireless communication technology wherein the network terminal device observing different power consumption in accordance with using the different communication technologies.

According to yet another aspect of the present invention there is provided a method for selecting a wireless communication technology wherein the communication technologies include at least two of: UMTS, W-CDMA, HSDPA, TD-CDMA, TD-SCDMA, 3GSM, GPRS, E-GPRS and EDGE.

According to still another aspect of the present invention there is provided a method for selecting a wireless communication technology wherein the communication parameters include bandwidth, throughput, bit-rate, quality of service, power consumption and idle state.

Further according to another aspect of the present invention there is provided a method for selecting a wireless communication technology wherein one of the GPRS, E-GPRS and EDGE communication technologies is selected when the network terminal device is in idle state, and/or wherein one of the UMTS, W-CDMA, HSDPA, TD-CDMA, TD-SCDMA, and 3GSM communication technologies is selected when the network terminal device is in a communication state requiring at least one of: voice over internet protocol (VoIP), video over Internet protocol, and streaming content.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF THE INVENTION

The principles and operation of an multi-technology communication network in general, and a communication network terminal device capable of selecting a communication technology according to communication requirements in particular, according to the present invention, may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

Figure 1:
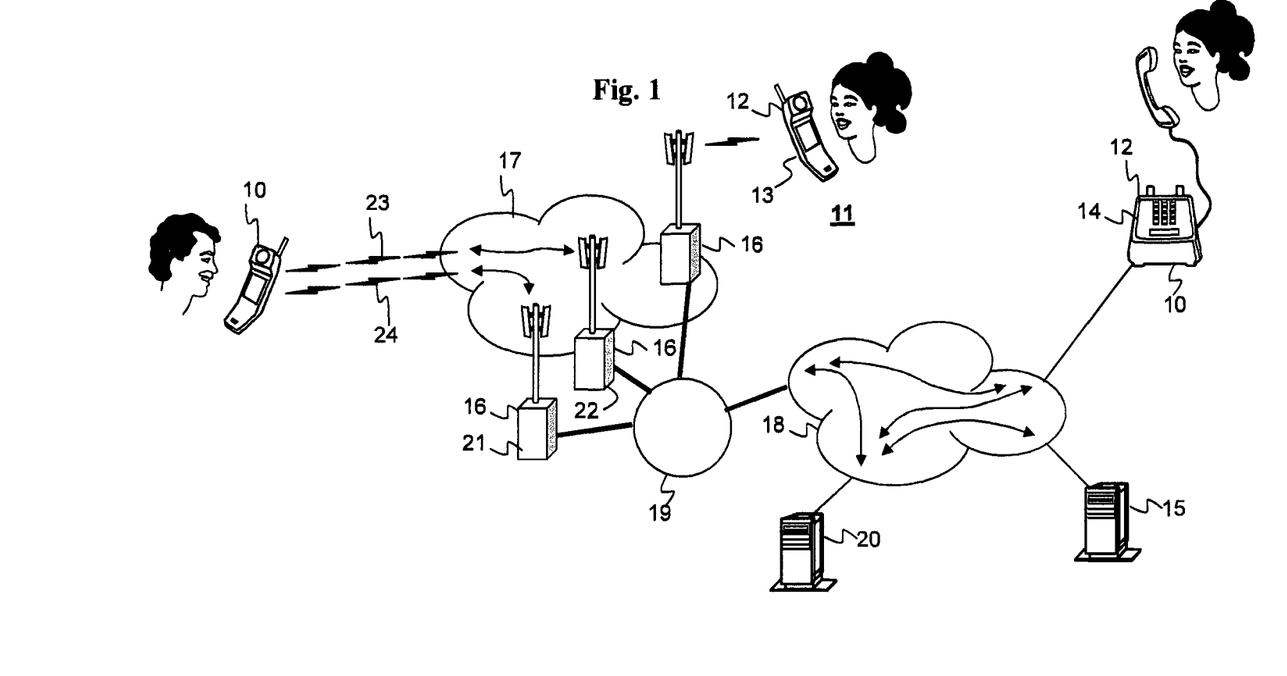
FIG. 1 is a simplified illustration of a communication network terminal device capable of selecting a communication technology according to communication requirements, operating in an multi-technology communication network.

Reference is now made to FIG. 1, which is a simplified illustration of a communication network terminal device 10 capable of selecting a communication technology according to communication requirements, operating in an multi-technology communication network 11, according to a preferred embodiment of the present invention.

As shown in FIG. 1, the multi-technology communication network 11 includes at least one terminal device 10 preferably communicating with another terminal device 12, such as mobile terminal device 13, or a fixed terminal device 14, or with a server 15 connected to the network, or with any other network device. Preferably, the terminal device 10 is a mobile terminal device communicating with a base station 16 via a wireless communication network 17.

The wireless communication network 17 can use a wireless communication technology such as WMAN, WLAN or WPAN. Preferably the wireless communication network 17 is a wireless MAN network such as cellular telephony, WiMAX, etc. Preferably, the communication network 17 is a cellular network such as: UMTS, W-CDMA, HSDPA, TD-CDMA, TD-SCDMA, 3GSM, GPRS, E-GPRS, EDGE., etc. Preferably, the wireless communication network 17 is a digital packet switching network.

It is appreciated that, typically, the above mentioned communication technologies and other possible communication technologies differ by one or more parameters such as (but not limited to) bandwidth, throughput, bit-rate, quality of service and power consumption.

Preferably, the terminal device 10 is application-adaptive, by enabling a communication oriented application executed by the terminal device 10 to select a communication technology from a plurality of communication technologies provided by the multi-technology communication network 11. Preferably, the plurality of communication technologies is provided by the wireless communication network 17.

The multi-technology communication network 11 may also include a fixed communication network 18 to which fixed network terminals and server, such as terminal 14 and/or server 15 can connect. Preferably, the base stations 16 communicate with a wireless communication center 19, which communicates with one or more fixed networks such as network 18.

In a preferred implementation of the present invention the network terminal 10 is a peer device in a peer-to-peer network, which includes a peer server 20, preferably connected to a fixed network such as network 18. Preferably, network 18 is an Internet Protocol network.

In one, non-limiting, implementation of the present invention the wireless communication network 17 operates two or more communication technologies, preferably using different communication technologies. For example, a first communication technology can be a 2.5 generation cellular technology such as GPRS, E-GPRS, EDGE, etc., and the second communication technology can be a 3rd generation cellular technology such as UMTS, W-CDMA, HSDPA, TD-CDMA, TD-SCDMA, 3GSM, etc. Other combinations can include a 3.5 generation technology, a $4^{th}$ generation technology, WiMAX (IEEE802.16) technology, etc. In the multi-technology communication network 11 shown in FIG. 1 the two communication technologies use different base stations. Base-station 21 preferably supports GPRS or a similar technology and Base-station 22 preferably supports UMTS or a similar technology. Preferably, the two communication technologies are provided by the same network operator.

It is appreciated that a single base-station can support the two communication technologies.

The terminal device 10 is preferably capable of communicating via two communication technologies (or more) such as communication technology 23, which may be a GPRS or a similar communication technology and communication technology 24, which may be a UMTS or a similar communication technology. The terminal device 10 is preferably capable of selecting between the communication technologies.

It is appreciated that different communication technologies have different characteristics. Communication technologies typically differ in bandwidth, throughput, quality of service (QoS), range, mobility (maximum terminal velocity), power consumption, etc. It also appreciated that different applications require different network characteristics. For example, different throughput and different power consumption are required for applications involving the following media: voice, music, video (typically streaming), text, data, image, messaging (e.g. SMS), instant messaging, chat, download, upload, web surfing, idle mode.

Preferably, the terminal device 10 enables an application being executed within the terminal device 10 and communicating via the wireless communication network 17 to select a communication technology that complies with the communication requirements of the application.

Preferably, the terminal device 10 is also capable of switching between communication technologies when switching between applications of different communication requirements.

Preferably, the terminal device 10 is also capable of switching between communication technologies when an application completes.

Preferably, a communication technology is selected by an application and/or by the terminal device 10 to provide the communication requirements at the lowest power consumption. Preferably, when no application is executed by the terminal device 10 the terminal device 10 switches to the communication technology that has the lowest power consumption.

In the case that the terminal device 10 is a peer in a peer-to-peer network, the terminal device 10 can communicate with another peer such as terminals 12 and/or server 15 via the peer server 20. In such case part of an application used by the terminal device 10 can be executed by the peer server 20. In such situation it is possible that the peer server 20, or, preferably, the part of the application executed by the peer server 20, will determine, at least partially, the communication requirements and will instruct the terminal device 10 to select the appropriate communication technology.

Figure 2:
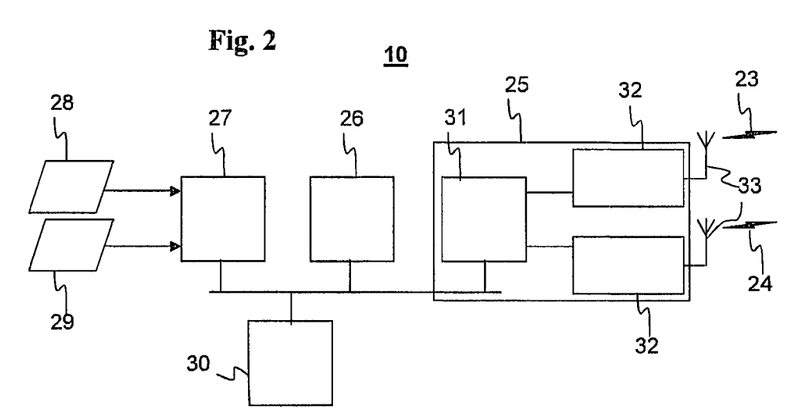
FIG. 2 is a simplified block diagram of a terminal device of the multi-technology communication network.

Reference is now made to FIG. 2, which is a simplified block diagram of the terminal device 10 according to a preferred embodiment of the present invention.

As seen in FIG. 2, the terminal device 10 preferably contains a communication module 25, an application processor 26, a memory or storage unit 27 preferably storing at least one application software program 28 and/or a communication resource manager 29 software program, and a power source 30 such as a battery. Preferably, the communication module 25 contains a communication processor 31 and two (or more) communication technology modules 32. Preferably, each communication technology module 32 supports a different communication technology (e.g. communication technologies 23 and 24). It is appreciated that the terminal device 10 can use a single antenna 33 (instead of a separate antenna for each communication module 32.

Preferably, the application program 28, and/or the communication resource manager program 29 can cause the application processor 26 to instruct the communication module 25 to switch between the communication technologies 23 and 24.

It is appreciated that the application 28 (as well as the communication resource manager 29 and/or the peer device 20) can cause selection and switching between communication technologies, back and forth, throughout the course of an application, according to the temporal communication requirements of the application.

Figure 3:
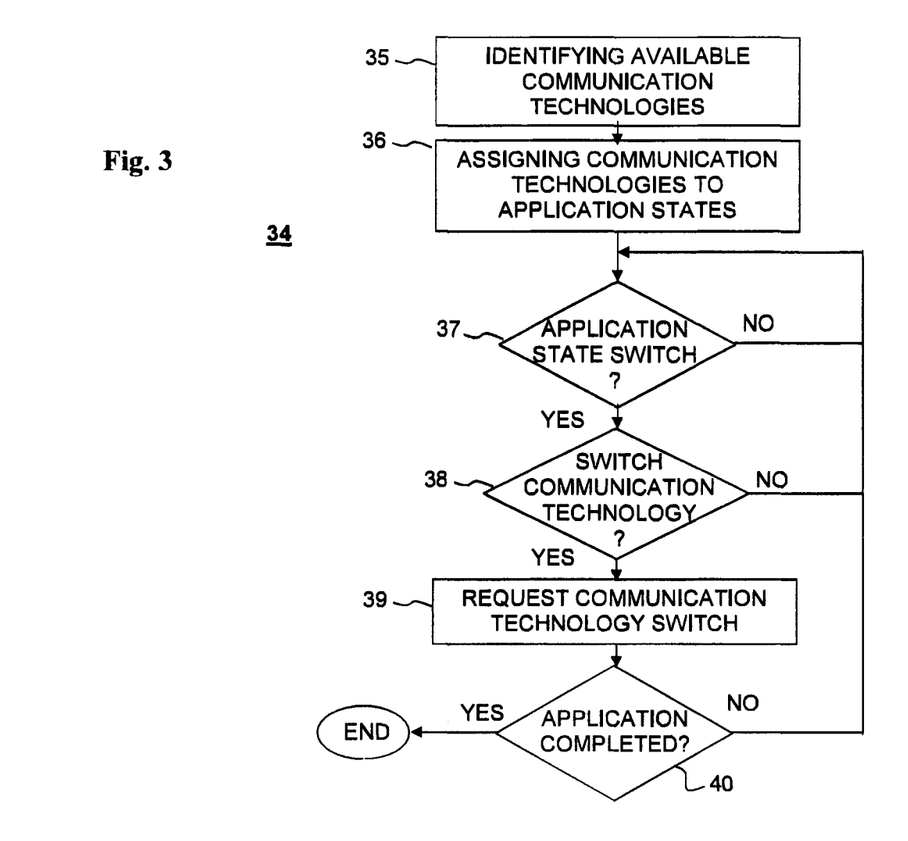
FIG. 3 is simplified flow chart of a communication-technology selection procedure performed by the terminal device of the multi-technology communication network for selecting a communication technology according to communication requirements of a state of an application executed by the terminal device.

Reference is now made to FIG. 3, which is a simplified flow chart of an application-state-based communication-technology selection procedure 34, preferably performed by the terminal device 10 according to a preferred embodiment of the present invention.

The application-state-based communication-technology selection procedure 34 (hereinafter "selection procedure 34") is preferably a part of, or performed by, the application 28, preferably executed by the application processor 26 of the terminal device 10. Alternatively, at least part of the selection procedure 41 is executed by the communication resource manager 29 and/or the peer server 20.

As described above, the terminal device 10 (and/or the peer server 20) operates in an multi-technology communication network 11 concurrently providing the network terminal device 10 with at least two different communication technologies. Preferably, the communication technologies differ by at least one communication parameter such as power consumption, bandwidth, bit-rate, throughput, quality of service, etc.

As seen in FIG. 3, the selection procedure 34 preferably starts by identifying the communication technologies provided by the multi-technology communication network 11 (step 35) and assigning a communication technology preferably to each state (phase) of the application (step 36). The step 36 of assigning communication technologies to application states can be performed before step 35 and even before loading the application to the terminal device 10.

The selection procedure 34 preferably proceeds to determine if the application has switched to a new state (step 37). If the application switched to a new state, the selection procedure 34 determines if a switch to a different communication technology is required (step 38). If switching communication technology is required, the selection procedure 34 sends a request to switch the communication technology. The request to change communication technology is preferably sent to the multi-technology communication network 11 (step 39). Alternatively, request to change communication technology is sent to the communication resource manager 29 and/or the peer server 20 to be sent to the multi-technology communication network 11. When the application completes, as determined by step 40, the selection procedure 34 preferably terminates.

Figure 4:
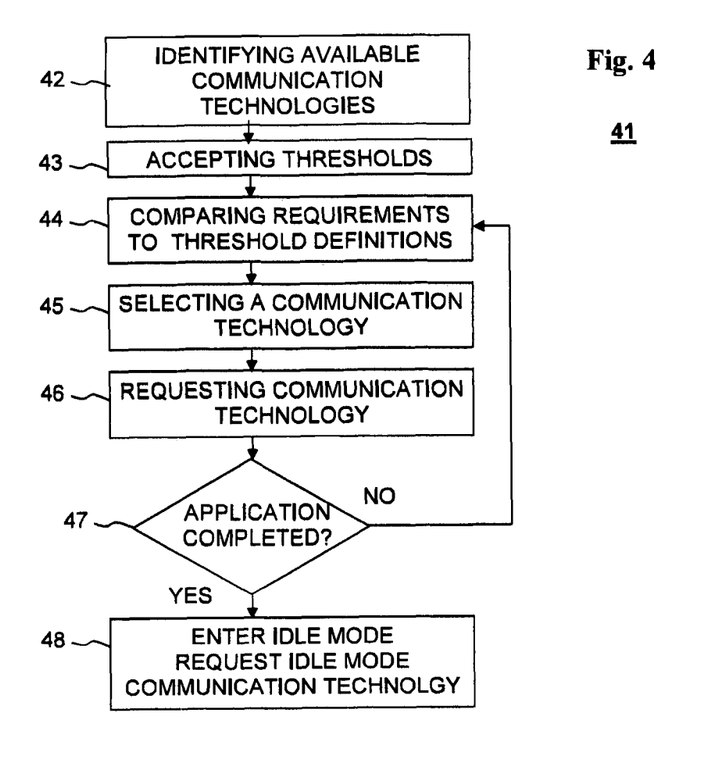
FIG. 4 is simplified flow chart of parameter-based communication-technology selection procedure performed by a terminal device of the multi-technology communication network for selecting a communication technology according to a communication parameter.

Reference is now made to FIG. 4, which is a simplified flow chart of a parameter-based communication technology selection procedure 41, preferably performed by the terminal device 10 according to another preferred embodiment of the present invention.

Similarly to the selection procedure 34, the parameter-based communication technology selection procedure 41 (hereinafter "selection procedure 41") is preferably a part of, or performed by, the application 28, preferably executed by the application processor 26 of the terminal device 10. Alternatively, at least part of the selection procedure 41 is executed by the communication resource manager 29 and/or the peer server 20. The terminal device 10 (and/or the peer server 20) operates in a communication network concurrently providing the network terminal device 10 with at least two different communication technologies differing by at least one communication parameter.

Both application-state-based selection procedure 34 and parameter-based selection procedure 41 switch between communication technologies according to the communication requirements of the application in different phases of the operation of the application. Typically and preferably, both selection procedure 34 and selection procedure 41 switch to the communication technology that provides the required communication parameter, such as bandwidth, bit-rate, throughput, quality of service, at the lowest power consumption. The selection procedure 34 switches between communication technologies according to the application state. As described in accordance with FIG. 3, a communication technology is assigned to each state (or phase) of the application and when the application enters the state the application request to switch to the assigned communication technology. The selection procedure 41 determines the required communication technologies according to a predefined communication parameter threshold. As described in accordance with FIG. 4, a communication parameter threshold is assigned to each communication parameters and the application considers the communication requirements at various places of the application and determines the required communication technology.

Preferably, the selection procedure 41 starts with step 42, by identifying the available communication technologies (e.g. the communication technologies 23 and 24 of FIG. 1). Such communication technologies may UMTS, W-CDMA, HSDPA, TD-CDMA, TD-SCDMA, and 3GSM and GPRS, E-GPRS, EDGE, WiMAX, etc.

with step 43, by accepting threshold definitions for at least one communication parameter. Preferably, these communication parameters differentiate between the communication technologies provided to he network terminal device 10 (e.g., the communication technologies 23 and 24 of FIG. 1). The communication parameters can be bandwidth, throughput, bit-rate, quality of service, power consumption and idle state.

Preferably, the selection procedure 41 proceeds with step 44, by comparing at least one required communication parameter with at least one of the thresholds and forms a comparison result.

Preferably, the selection procedure 41 proceeds with step 45 to select one of the communication technologies according to the comparison result. Preferably, step 45 selects the communication technology requiring the lowest power consumption and supporting the communication requirement of the application at that time.

Preferably, step 45 selects one of GPRS, E-GPRS and EDGE communication technologies when the application requires relatively low bandwidth, throughput, bit-rate or quality of service, or when the network terminal device is in idle state.

Preferably, step 45 selects one of UMTS, W-CDMA, HSDPA, TD-CDMA, TD-SCDMA, and 3GSM communication technologies when the application is in a communication state requiring at least one of:
voice over Internet protocol (VoIP);
video over Internet protocol; and
streaming content.

Preferably, the selection procedure 41 proceeds with step 46 to send a request to the communication network to switch to the selected communication technologies.

If the application 28 completes (step 47) the selection procedure 41 enters idle mode by requesting the communication technology best suited for idle mode (step 48).

It is expected that during the life of this patent many relevant methods and systems will be developed and the scope of the terms herein, particularly of the terms "wireless communication technology" is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for a terminal device to select a wireless communication technology from a plurality of wireless communication technologies available for communicating over a communication network, the method comprising the steps of:
providing a communication application operative in a network terminal device and configured to change from one operational state to at least one other operational state, said network terminal device operative in a communication network, said communication network providing said network terminal device with at least two different communication technologies from which the network terminal device can select for communications, said communication technologies differing by at least one parameter;
associating a first operational state of the communication application with at least one of said at least two different communication technologies based at least in part on said at least one differing parameter; and
based on a current operational state of the communication application, switching to communicate in the communication technology associated with the current operational state;
wherein commencing communication in the communication technology associated with the current operational state is executed by said communication application operating in said network terminal device according to said current operational state of said application.

2. The method for selecting a wireless communication technology according to claim 1, wherein said communication technologies differ according to at least one of the parameters selected from the group of parameters including: power consumption, bandwidth, bit-rate, throughput and quality of service.

3. The method for selecting a wireless communication technology according to claim 1, wherein said communication technologies comprise at least one of: UMTS, W-CDMA, HSDPA, TD-CDMA, TD-SCDMA, and 3GSM; and at least one of GPRS, E-GPRS and EDGE.

4. The method for selecting a wireless communication technology according to claim 3, wherein the communication parameters of said network terminal device change when the network terminal device changes operational states, and wherein one of said GPRS, E-GPRS and EDGE communication technologies is selected when said network terminal device is to enter an idle state.

5. The method for selecting a wireless communication technology according to claim 3, wherein the communication parameters of said network terminal device change when the network terminal device changes operational states, and wherein one of said UMTS, W-CDMA, HSDPA, TD-CDMA, TD-SCDMA, and 3GSM communication technologies is selected when said network terminal device is to enter a communication state requiring at least one of:
voice over Internet protocol (VoIP);
video over Internet protocol;
and streaming content.

6. The method for selecting a wireless communication technology according to claim 1, wherein the communication parameters of said network terminal device change when the communication application operative in a network terminal device changes operational states, and wherein a change of said application state is associated with a change in at least one of: bandwidth, throughput, bit-rate, quality of service, power consumption and idle state.

7. The method for selecting a wireless communication technology according to claim 1, wherein said network terminal device observes different power consumption in accordance with using said different communication technologies.

8. A method performed by a network terminal device, the method comprising:
associating a first state of a communication application of the network terminal device with a first one of a plurality of available wireless communication technologies;
associating a second state of the communication application with a second one of the plurality of available wireless communication technologies, the second one of the plurality of available wireless communication technologies being different than the first one of a plurality of available wireless communication technologies; and
in response to a change in application state from the first state to the second state, switching from use of the first one of the plurality of available wireless communication technologies to the second one of the plurality of available wireless communication technologies.

9. The method of claim 8, wherein the plurality of available wireless communication technologies vary in at least one communication parameter from the group consisting of: power consumption, bandwidth, bit-rate, throughput and quality of service.

10. The method of claim 8, wherein associating the first state of the communication application with a first one of a plurality of available wireless communication technologies is based on power consumption of the first state of the communication application.

11. The method of claim 8, wherein associating the first state of the communication application with a first one of a plurality of available wireless communication technologies is based on throughput of the first state of the communication application.

12. The method of claim 8, wherein the plurality of available communication technologies comprise at least two of: UMTS, W-CDMA, HSDPA, TD-CDMA, TD-SCDMA, and 3GSM; and at least one of GPRS, E-GPRS and EDGE.

13. The method of claim 8, wherein the second state is an idle state.

14. The method of claim 12, wherein the second one of the plurality of communication states comprises one of: GPRS, E-GPRS and EDGE.

15. The method of claim 8, wherein the first state of the communication application comprises use of at least one of: voice over Internet protocol (VoIP), video over Internet protocol, and streaming content.

16. A network terminal device comprising:
a processor; and
a memory comprising machine readable instructions that when executed by the processor, cause the network terminal device to:
associate a first state of a communication application of the network terminal device with a first one of a plurality of available wireless communication technologies;
associate a second state of the communication application with a second one of the plurality of available wireless communication technologies, the second one of the plurality of available wireless communication technologies being different than the first one of a plurality of available wireless communication technologies; and
in response to a change in application state from the first state to the second state, switch from use of the first one of the plurality of available wireless communication technologies to the second one of the plurality of available wireless communication technologies.

17. The device of claim 16, wherein to associate the first state of the communication application with a first one of a plurality of available wireless communication technologies is based on power consumption of the first state of the communication application.

18. The device of claim 16, wherein to associate the first state of the communication application with a first one of a plurality of available wireless communication technologies is based on throughput of the first state of the communication application.

19. The device of claim 16, wherein the plurality of available communication technologies comprise at least two of: UMTS, W-CDMA, HSDPA, TD-CDMA, TD-SCDMA, and 3GSM; and at least one of GPRS, E-GPRS and EDGE.

20. The device of claim 16, wherein the second state is an idle state and wherein the second one of the plurality of communication states comprises one of: GPRS, E-GPRS and EDGE.

21. The device of claim 16, wherein the plurality of available wireless communication technologies vary in at least one communication parameter from the group consisting of: power consumption, bandwidth, bit-rate, throughput and quality of service.

* * * * *